United States Patent [19]
Andreassen

[11] Patent Number: 6,082,236
[45] Date of Patent: Jul. 4, 2000

[54] NOISE ELMINATING ADAPTOR FOR A CUTTING TOOL

[75] Inventor: Lauritz I. Andreassen, Trondheim, Norway

[73] Assignee: Teeness A/S, Trondheim, Norway

[21] Appl. No.: 09/043,870

[22] PCT Filed: Sep. 20, 1996

[86] PCT No.: PCT/NO96/00225

§ 371 Date: Sep. 25, 1998

§ 102(e) Date: Sep. 25, 1998

[87] PCT Pub. No.: WO97/10912

PCT Pub. Date: Mar. 27, 1997

[30] Foreign Application Priority Data

Sep. 21, 1995 [NO] Norway .................................. 953742

[51] Int. Cl.[7] .................................................. B23B 29/00
[52] U.S. Cl. ............................... 82/161; 82/163; 82/904; 408/143
[58] Field of Search ............................. 82/161, 163, 904, 82/158; 408/143; 409/141; 74/574

[56] References Cited

U.S. PATENT DOCUMENTS

| | | | |
|---|---|---|---|
| 2,596,821 | 5/1952 | Parkins ................................. | 408/143 X |
| 3,663,116 | 5/1972 | Muller et al. ........................... | 408/143 |
| 3,837,758 | 9/1974 | Streicher ................................. | 408/143 |
| 3,838,936 | 10/1974 | Andreassen et al. ................... | 408/143 |
| 4,447,181 | 5/1984 | Asano ..................................... | 409/345 |
| 4,491,044 | 1/1985 | Haas et al. .............................. | 82/36 A |
| 4,605,349 | 8/1986 | Bone ....................................... | 409/141 |
| 5,033,340 | 7/1991 | Siefring ................................... | 82/158 |

FOREIGN PATENT DOCUMENTS

| | | | |
|---|---|---|---|
| 0090929 | 10/1983 | European Pat. Off. ................. | 82/904 |
| 1238311 | 4/1967 | Germany ............................... | 408/143 |
| 0743788 | 6/1980 | U.S.S.R. ................................. | 82/904 |
| 1171240 | 8/1985 | U.S.S.R. ................................. | 408/143 |
| 425539 | 4/1935 | United Kingdom ................... | 408/143 |
| WO92/14947 | 9/1992 | WIPO . | |

*Primary Examiner*—Henry W. H. Tsai
*Attorney, Agent, or Firm*—Carter J. White; Howrey Simon Arnold & White LLP

[57] ABSTRACT

An adaptor is inserted between a cutting tool and a clamping section of a tool machine. The adaptor comprises a tool clamping part holding the tool, and an adaptor clamping part which is held by the machine. Between the two parts there is a bearing which controls the relative movement between the two parts in such a manner that this movements does not influence machined geometry, dimension or surface of the work piece machined by the tool, to any significant degree, and an elastic damping member which ensures that a possible relative movement between two parts is damped down to a desired degree. Possible vibrations in the tool are thereby kept down on a level where they do not contribute to amplify the normal sound pressure from the machining operation, and an efficient noise suppression is achieved.

7 Claims, 3 Drawing Sheets

NOISE ELMINATING ADAPTOR FOR A CUTTING TOOL

BACKGROUND OF THE INVENTION

The present invention relates to a means for elimination for frequency control of health injurious noise originating in high frequency oscillations in cutting tools, and in particular tool adaptors for eliminating such noise.

Vibrations in cutting tools most often will result in unacceptable surfaces, and/or deviations in geometry and dimensions of the work piece. Vibrations may also easily lead to mechanical overload and damage to machines and tools. In addition, the vibrations often will excite noise which is troublesome or even damaging to health within the work area of the machine operator.

In some unique cases, noise is the only noticeable disadvantage of the vibrations in the cutting tool. Ejector boring may be the most typical machining process where this is often the case; however also in short hole boring, lathe cutting and other operations there will often be vibrations to give unhealthy noise, without having unacceptable machining results. Traditionally the situation has been that proper quality and optimum productivity have impelled the development of tools, while the motivation for working with pure noise suppression in chip cutting operations, has so far not been particularly great.

Laws and regulations relating to the work environment, have been made more stringent internationally, and this has had as a result that health injurious noise burdens in the work areas of the operators are no longer acceptable, and the engineering industry has become busy finding solutions.

The present invention is a solution which will remove a large part of the applications which suddenly now have landed on the engineering industry's list of unacceptable sources of noise.

Even if the prior art so far regarding damping vibrations in cutting operations originate in a motivation for improving processes where vibrations are a quality-related or a productivity-hampering problem. It is also naturally a fact that all damping of vibrations is also suppression of noise.

U.S. Pat. No. 3,663,116 shows an arrangement intended to dampen torsional vibrations in machine parts which can be regarded as cantilever beams, in particular tool holders which are clamped tightly in one end, such as boring bars. The arrangement consists of an outer jacket, which in one end is fixedly connected to a torsionally stiff core which is situated centrally within the jacket. An energy dissipating material between the inner jacket surface and the outer surface of the core, provides for damping of torsional movements between the jacket and the core. A special feature of this arrangement is that the jacket itself will always have to be deformed more than the energy-absorbing material during such torsional motion.

U.S. Pat. No. 4,447,181 shows an arrangement intended to dampen vibrations and clattering in a tool holder, by means of a recess provided in the center of the engagement surface between the tool holder and the further fastening means therefor toward the tool machine, inside which recess a rubber pad is compressed.

U.S. Pat. No. 4,491,044 discloses an arrangement for damping a tool fixing plate for several boring bars, mounted on a revolver in a tool machine, and in which the clearance between tool surfaces and hydraulic seals create a closed damping chamber between the revolver spindle end surface and the tool fixing plate. Oil or a viscoelastic material in the damping chamber is intended to dampen the relative movement between the fixing plate and the revolver.

U.S. Pat. No. 5,033,340 discloses an arrangement intended to minimize high frequency vibrations of a boring bar cutting tip, by compressing a damping sandwich placed at a joint between the boring bar holder and the tool mounting area of the tool machine. An essential part of the arrangement is how to fix the holder against the mount area while avoiding metal-to-metal contact in the compression direction of the damping sandwich.

As to conception, the present invention differs from all the above mentioned arrangements in that it comes as a solution to a problem which is exclusively a work environmental problem, and not a quality or productivity problem. The primary value is the user's experience of the invention as a noise suppression means, and this experience is the most important motivation for its conception.

Technically, the present invention differs from all the above mentioned arrangements in that it is based upon the feature that possible oscillations in the tool must first be guided into a simple oscillation which will not give any negative results in the machined work piece, and that thereafter, sufficient energy is taken out of the oscillation that it does not excite any troublesome sound in the machining process.

The present invention is primarily intended to be utilized in tool mount adaptors with a standard interface, which can be inserted in the tool machine as a modular tool adaptor. As an alternative to reductions in cutting speed, efficiency-diminishing design changes in the tool itself, or noise-isolating cabinets built around the complete tool machine, such an adaptor will have a superior utilitarian value.

For boring tools, the utilization of the invention is relatively simple. In this case one will often find that the noise-generating oscillations substantially coincide with pure torsional oscillations in the tool. This oscillation has the effect that the cutting speed of the edges varies; however it does not affect measurably the produced quality, neither in diameter nor in the surface. Such oscillations can also be advantageous for the progress of the cutting operation in that they pulse the laminating process, and thereby ensures chip breaking in the machining.

The adaptor in accordance with the invention is defined precisely in the appended patent claims.

BRIEF DESCRIPTION OF THE DRAWINGS

For a more detailed explanation of the invention, some embodiment examples shall now be mentioned, and it is at the same time referred to the appended drawings, wherein.

In a first embodiment the invention is shown as a means able to translate high-frequency torsional oscillations in a boring tool, to a frequency where sound from the boring bar does not give any measurable amplification of the sound pressure otherwise to be found at the working machine. Such a means appears in FIGS. 1, 2, and 3.

This case concerns damping of high-frequency torsional oscillators in short-hole boring bars with a hard metal cutting tip. Extreme variants of such short-hole boring bars, for working lengths up to 5× bore diameter, will with a conventional clamping give a health injurious noise in the working area of the machine operator. Measurements show that the sound pressure will typically stay on a level right above 100 dBA, and with a predominant pitch in the frequency range 2–6 kHz. Built into this tool adaptor, the system will demonstrate its good function by changing the torsional oscillations in the short-hole boring bar to such a degree that the noise from the boring bar oscillations vanishes and is no longer perceptible as a contribution to the total sound pressure from the machine.

Figure 1:
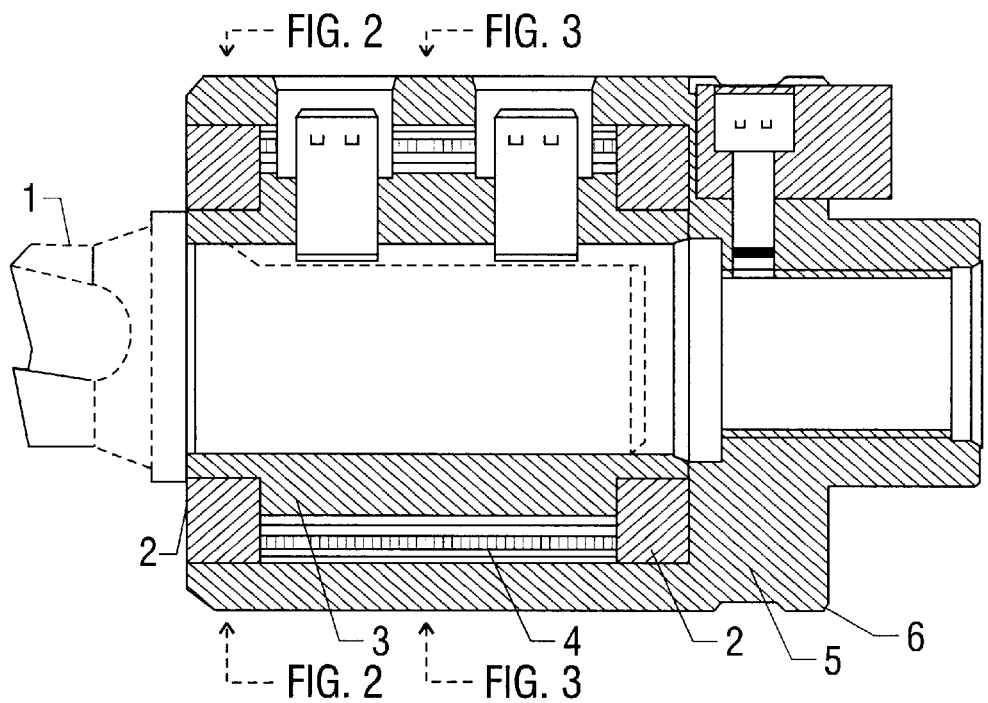
FIG. 1 shows a longitudinal section of an embodiment of the adaptor, designed for boring operations.
Figure 2:
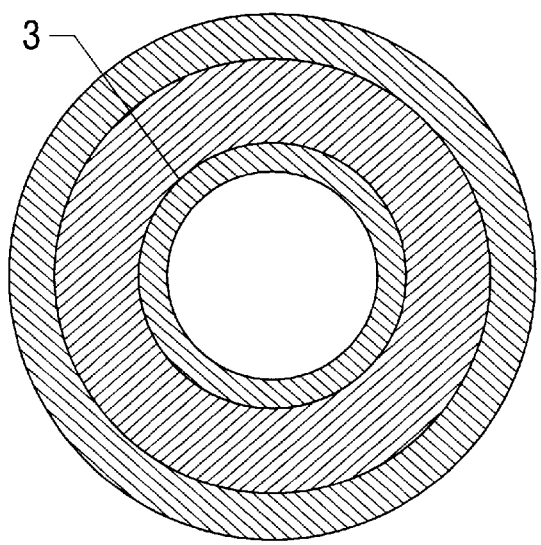
FIG. 2 shows a view along the line A—A of the embodiment of FIG. 1.
Figure 3:
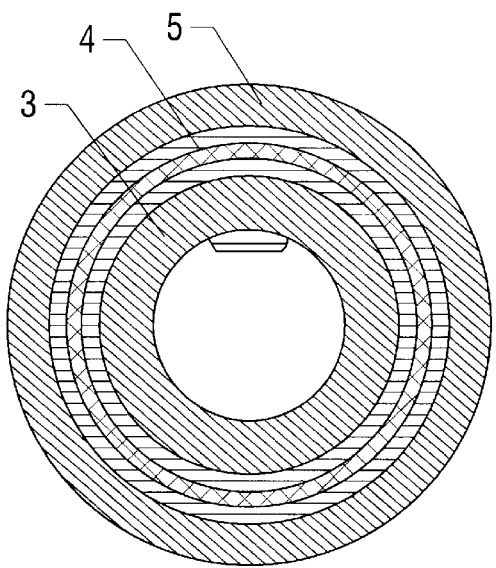
FIG. 3 shows a view along the line B—B of the embodiment in FIG. 1.

The tool adaptor 6 in FIGS. 1, 2, and 3 show in the case a WELDON type mounting of the short-hole boring bar 1. Many other standard or special mounts may be used instead. A clamping sleeve 3 is supported externally in the bushing 5 which forms the whole adaptor at the outside, and which in this case has a male part of a coupling for modular tools, for tight clamping toward a spindle or a tool holder.

The supports 2 provide the clamping sleeve with a freedom to rotate relatively to the bushing 5. Rotation is in this case a movement with a direction to make it suitable to accommodate those oscillations which cause the high-frequency noise that such tools often make.

The possible rotation is restricted by means of an elastic member 4 which is placed so as to have a solid contact surface bond against the cylinder surface on the outside of the clamping sleeve 4, and a solid contact surface bond against the cylinder surface on the inside of bushing 5. Any rotation of the clamping sleeve 3 relative to the bushing 5 will thereby cause a deformation of the elastic material in the spring member 4. The spring member 4 is adapted through dimensioning and choice of material, so as to provide a spring constant and a damping coefficient which provide for translation of high-frequency vibrations into frequencies which do not excite troublesome noise, and at the same time the oscillation amplitude is held within acceptable magnitudes. The white border areas on both sides of the spring member 4 merely indicate schematically vulcanizing areas. For the rest, the spring member may as well consist of several part members.

Figure 4:
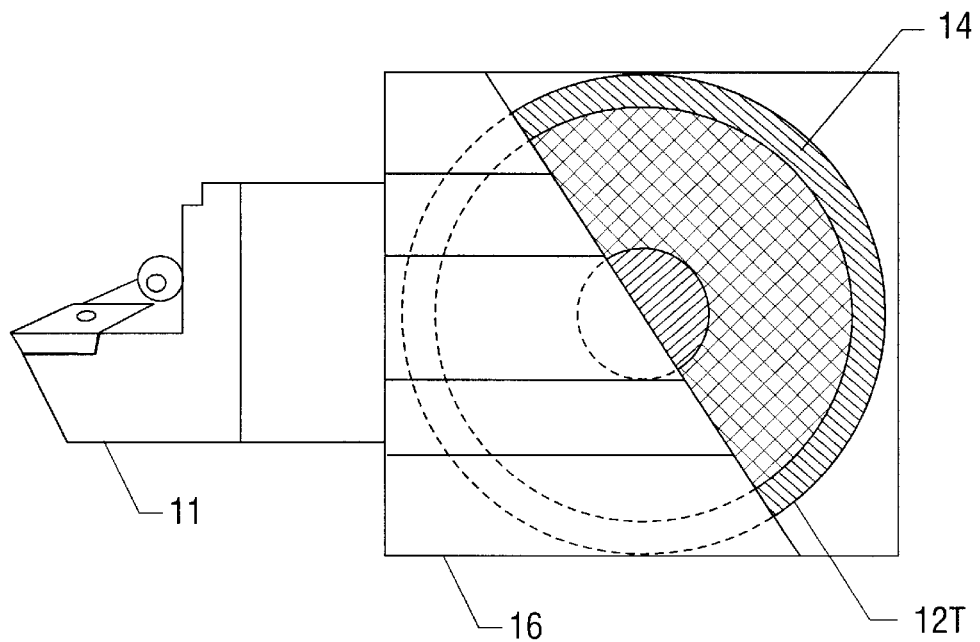
FIG.4 shows an embodiment in which an adaptor is designed for lathe cutting, showing a cross-section of the adaptor.
Figure 5:
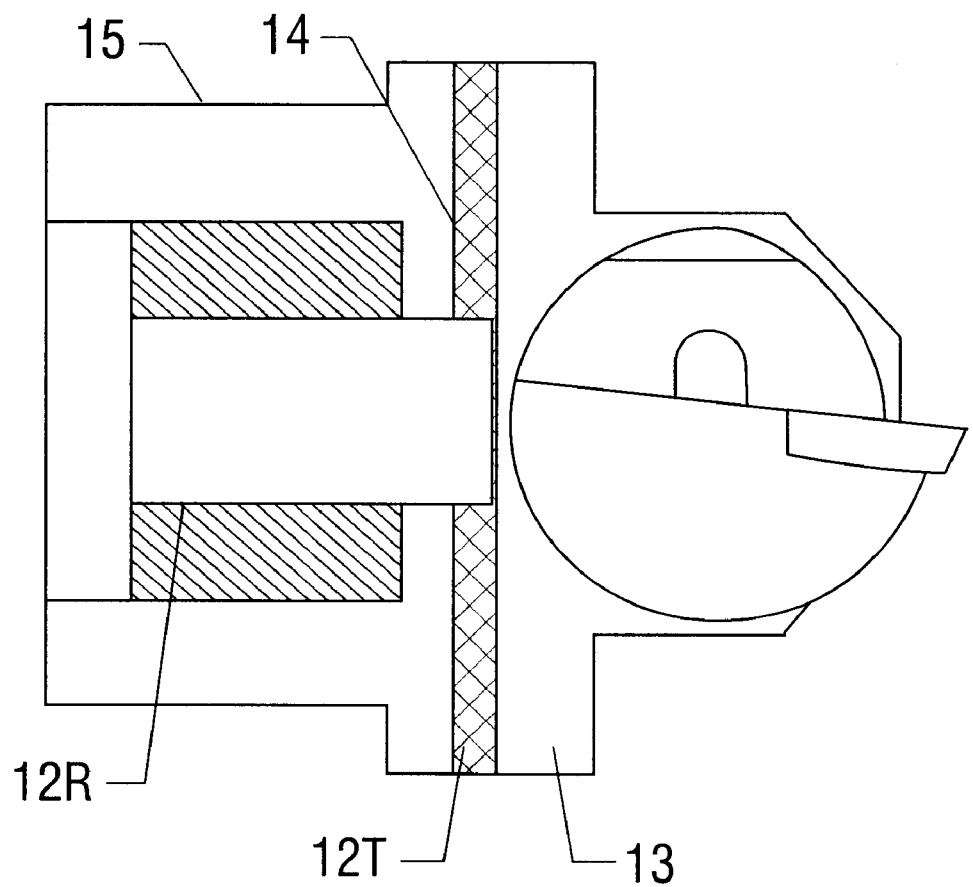
FIG. 5 shows a longitudinal section of the adaptor in FIG. 4.

FIGS. 4 and 5 show another embodiment of the adaptor in accordance with the invention, viz. as a tool adaptor 16 for short modular cutting members for external lathe cutting. The radial supports 12R in this system gives the clamping sleeve 13, which has a tightly clamped cutting member 11, the freedom to pivot relative to the bushing 15, about a line which is perpendicular to the center line of the cutting member. The direction of the movement is controlled further by means of the thrust bearings 12T. Thereby the cutting edge has the freedom to oscillate in a small arcuate movement with a center through the center line of the radial supports 12R. However, the acceptable amplitude becomes very small, which makes the deviation of this arc from the direction of a stable, tangential cutting force negligible. Therefore the tool has also in this case been let loose intentionally in a direction where oscillations allowed during progress of the cutting operation does not affect produced quality measurably. And the spring/damping member or members 14 are also guided in this case dimensioned to that the tool is guided into an oscillation frequency which provides the desired results, so that the tool does not any more contribute to increase the sound pressure out from the tool machine. The largest absolute movement of the cutting tip can be limited by entering mechanical limitations in the adaptor itself, or it can be held within acceptable limits by dimensioning the spring force in the spring/damping members.

Thus, in accordance with the invention, there has been provided in general a means for eliminating health injurious noise from high-frequency vibrations in chip cutting machining, comprising an adaptor which on one hand in a conventional manner is tightly clamped in the tool machine, and where the cutting tool also in a conventional manner is tightly clamped in another part of the adaptor, but where, between these tight clamp mountings, the cutting tool with its clamping in the adaptor, is provided intentionally with the freedom to oscillate in directions have a negligible influence on the machined work piece. Mechanically robust supports guide and control the directions of the oscillation movements, and resilient spring/damping members ensure that the tool will oscillate in the free direction with acceptable amplitudes and desired frequency about a point of equilibrium where the elastic deformation of the spring members is zero.

Thus, the invention concerns a means which attacks noise at the source, but which provides a noise suppressing function without in reality eliminating the vibrations which excite the noise. The feature of releasing members that excite troublesome and loud noise, and thereafter guiding the vibrations of these members into vibrations where the sound pressure thereof is significantly reduced, or non-measurable, is the essential idea behind the present invention.

What is claimed is:

1. An adaptor for eliminating health injurious noise from a cutting tool (1; 11) for machining a work piece, said adaptor (6; 16) being arranged to be clamped in a clamping section of a tool machine, and where said tool (1; 11) is clamped into said adaptor (6; 16), which comprises a tool clamping part (3; 13) in which said tool (1; 11) is clamped, an adaptor clamping part (5; 15) which enters into clamping engagement with said clamping section of said tool machine when said adaptor (6; 16) is clamped therein, and at least one elastic damping member (4; 14) arranged substantially between said tool clamping part (3; 13) and said adaptor clamping part (5; 15), characterized in that said adaptor clamping part (5; 15) and said tool clamping part (3; 13) are supported mutually only by means of at least one support bearing (2; 12) which provides substantially free relative movement capability for said parts (3, 5; 13, 15) in one degree of freedom selected so that the movement gives negligible influence on machined dimension or surface quality of the work piece, and that said at least one elastic damping member (4; 14) being fixed to both said tool clamping part (3; 13) and said adaptor clamping part (5; 15) and being arranged to restrict said relative movement to an oscillation about a point of equilibrium, the material characteristics and dimensions of said at least one damping member (4; 14) being chosen to provide a predetermined spring constant and damping coefficient for achieving relocation of vibrational energy from health damaging frequencies to acceptable frequencies.

2. The adaptor of claim 1, for use with a rotating tool (1) of a boring type, driven by a boring machine, said tool (1)

having a longitudinal axis and being, in use, clamped in the tool clamping part (3) of the adaptor (6), characterized in that the two clamping parts (3, 5) which are arranged with said adaptor clamping part (5) substantially coaxially outside said tool clamping part (3) and coaxially in relation to the longitudinal axis of the tool when the tool is clamped, have two rotation bearings (2) arranged between them for providing free rotating relative movement between said parts (3, 5) about the longitudinal axis of the tool, and have at least one elastic damping member (4) provided coaxially between said two parts (3, 5) and solidly contact surface bonded to an inside cylinder surface in said adaptor clamping part (5) and an outside cylinder surface on said tool clamping part (3), respectively.

3. The adaptor of claim 1, for use with a cutting tool (11) for external lathe cutting of a work piece rotating in a lathe, said cutting tool (11) being tightly clamped on a movable tool clamping part (13), characterized in that the two clamping parts (13, 15) are coupled to each other by means of at least one rotary bearing (12R, 12T) which provides said tool clamping part (13) with a capability of free pivoting movement about an axis in said adaptor clamping part (15), said axis being positioned so that the pivoting movement takes place in a plane defined by the travel direction of the cutting tool (11) for the cutting operation, said adaptor clamping part (15) being tightly clamped to said lathe, and that a resilient damping member (14) is situated between said two parts (13, 15) in fixed engagement with opposing and complementary surfaces of both parts (13, 15) for limiting the pivoting movement of said cutting tool (11) when in use, to a controlled oscillating movement.

4. An adaptor for eliminating health injurious noise from a cutting tool for machining a work piece, said adaptor being arranged to be clamped in a clamping section of a tool machine, and where said cutting tool is clamped into said adaptor, said adaptor comprising a cutting tool clamping part in which said cutting tool is clamped, an adaptor clamping part which enters into clamping engagement with said clamping section of said tool machine when said adaptor is clamped therein, and at least one elastic damping member arranged substantially between said tool clamping part and said adaptor clamping part, wherein said adaptor clamping part and said tool clamping part are supported mutually by at least one support bearing, said support bearing providing free relative movement capability for said adaptor clamping part and said tool clamping part in one degree of freedom selected so that the movement gives negligible influence on machined dimension or surface quality of the work piece, and wherein said elastic damping member is fixed to both said tool clamping part and said adaptor clamping part, said elastic damping member being arranged to restrict said free relative movement to an oscillation about a point of equilibrium, the material characteristics and dimensions of said elastic damping member being chosen to provide a predetermined spring constant and damping coefficient for achieving redistribution of vibrational energy from health damaging frequencies to acceptable frequencies.

5. The adaptor of claim 4, wherein the cutting tool is of a boring type, driven by a boring machine, said cutting tool having a longitudinal axis and being, in use, clamped in the tool clamping part of the adaptor, and wherein the tool clamping part and the adaptor clamping part which are arranged with said adaptor clamping part substantially coaxially outside said tool clamping part and coaxially in relation to the longitudinal axis of the cutting tool when the cutting tool is clamped in the tool clamping part, and wherein at least one rotation bearing is arranged between the tool clamping part and the adaptor clamping part thus providing free rotating relative movement between the tool clamping part and the adaptor clamping part about the longitudinal axis of the cutting tool, and wherein at least one elastic damping member is provided coaxially between the tool clamping part and the adaptor clamping part and solidly contact surface bonded to an inside cylinder surface in said adaptor clamping part and an outside cylinder surface on said tool clamping part, respectively.

6. The adaptor of claim 4, wherein said cutting tool is for external lathe cutting of a work piece rotating in a lathe, said cutting tool being tightly clamped on the tool clamping part, and wherein the tool clamping part and the adaptor clamping part are coupled to each other by means of at least one rotary bearing which provides said tool clamping part with a capability of free pivoting movement about an axis in said adaptor clamping part, said axis being positioned so that the pivoting movement takes place in a plane defined by the cutting tool for the cutting operation, said adaptor clamping part being tightly clamped on the outside to said lathe, and wherein the elastic damping member is situated between said tool clamping part and said adaptor clamping part in fixed engagement with opposing and complementary surfaces of said tool clamping part and said adaptor clamping part for limiting the pivoting movement of said cutting tool when in use, to a controlled oscillating movement.

7. An adaptor for eliminating health injurious noise from a cutting tool for machining a work piece, said adaptor being arranged to be clamped in a clamping section of a tool machine, and where said cutting tool is clamped into said adaptor, said adaptor comprising a cutting tool clamping part in which said cutting tool is clamped, an adaptor clamping part which enters into clamping engagement with said clamping section of said tool machine when said adaptor is clamped therein, and at least one elastic damping member arranged substantially between said tool clamping part and said adaptor clamping part, wherein said adaptor clamping part and said tool clamping part are supported mutually by at least one support bearing, said support bearing providing free relative movement capability for said adaptor clamping part and said tool clamping part in one degree of freedom selected so that the movement gives negligible influence on machined dimension or surface quality of the work piece, and wherein said elastic damping member is fixed to both said tool clamping part and said adaptor clamping part, said elastic damping member being arranged to restrict said free relative movement to an oscillation about a point of equilibrium, the material characteristics and dimensions of said elastic damping member being chosen to provide a predetermined spring constant and damping coefficient for achieving redistribution of vibrational energy from health damaging frequencies to acceptable frequencies, and wherein the cutting tool is of a boring type, driven by a boring machine, said cutting tool having a longitudinal axis and being, in use, clamped in the tool clamping part of the adaptor, and wherein the tool clamping part and the adaptor clamping part which are arranged with said adaptor clamping part substantially coaxially outside said tool clamping part and coaxially in relation to the longitudinal axis of the cutting tool when the cutting tool is clamped in the tool clamping part, and wherein at least one rotation bearing is arranged between the tool clamping part and the adaptor clamping part thus providing free rotating relative movement between the tool clamping part and the adaptor clamping part about the longitudinal axis of the cutting tool, and wherein at least one elastic damping member is provided coaxially between the tool clamping part and the adaptor clamping part and solidly contact surface bonded to an inside cylinder surface in said adaptor clamping part and an outside cylinder surface on said tool clamping part, respectively.

* * * * *